United States Patent
Yamada et al.

(10) Patent No.: US 12,542,192 B2
(45) Date of Patent: Feb. 3, 2026

(54) STACKED MEMORY AND MANUFACTURING METHOD THEREFOR

(71) Applicant: UltraMemory Inc., Tokyo (JP)

(72) Inventors: Yasutoshi Yamada, Tokyo (JP); Naoki Ogawa, Tokyo (JP); Yuji Motoyama, Tokyo (JP)

(73) Assignee: UltraMemory Inc., Tokyo (JP)

( * ) Notice: Subject to any disclaimer, the term of this patent is extended or adjusted under 35 U.S.C. 154(b) by 207 days.

(21) Appl. No.: 18/681,760

(22) PCT Filed: Aug. 6, 2021

(86) PCT No.: PCT/JP2021/029421
§ 371 (c)(1),
(2) Date: Feb. 6, 2024

(87) PCT Pub. No.: WO2023/013065
PCT Pub. Date: Feb. 9, 2023

(65) Prior Publication Data
US 2025/0037785 A1   Jan. 30, 2025

(51) Int. Cl.
G11C 29/00    (2006.01)

(52) U.S. Cl.
CPC ............ *G11C 29/76* (2013.01); *G11C 29/789* (2013.01); *G11C 29/84* (2013.01)

(58) Field of Classification Search
CPC .............................. G11C 29/76; G11C 29/00
(Continued)

(56) References Cited

U.S. PATENT DOCUMENTS

| 10,916,489 B1* | 2/2021 | Nishioka ............ G11C 29/4401 |
| 2010/0085825 A1* | 4/2010 | Keeth ..................... G06F 12/10 365/230.01 |

(Continued)

FOREIGN PATENT DOCUMENTS

| JP | 2012505491 A | 3/2012 |
| JP | 2014071932 A | 4/2014 |
| WO | WO2010/042496 A2 | 4/2010 |

*Primary Examiner* — Muna A Techane
(74) *Attorney, Agent, or Firm* — MUNCY, GEISSLER, OLDS & LOWE, P.C.

(57) ABSTRACT

Provided is a stacked memory with an improved yield rate and with which suitable operation timing control is possible. Also provided is a manufacturing method therefor. Provided is a stacked memory 1 obtained by stacking a plurality of memory chips, wherein the memory chips each include a plurality of memory cells, and comprise: a memory unit 20 that is capable of storing data and has a normal memory block 21 used mainly for reading and writing data and a spare memory block 22 substituted for a defective memory cell in the normal memory block 21; an address storage unit 30 that, for each of two or more stacked memory chips, stores a slice address identifying a memory chip serving as an object to undergo substitution of the normal memory block 21 with the spare memory block 22 as a substitution source slice address, and stores a memory address serving as the object to undergo substitution as a substitution source memory address; a comparison unit 50 that compares a request address indicating the slice address and memory address of an access request destination, and the substitution source address; a specification unit 60 that, on the basis of the comparison results, specifies the memory unit 20 that is actually to be accessed and generates an access timing; a timing control unit 80 that selects one from among the generated access timing and access timings transmitted from the other memory chips, and controls access to the memory (Continued)

unit 20 at the selected access timing; and an execution unit 70 that executes reading and writing to the specified memory unit 20 at the selected access timing.

19 Claims, 6 Drawing Sheets

(58) Field of Classification Search
USPC .................................................... 365/189.05
See application file for complete search history.

(56) References Cited

U.S. PATENT DOCUMENTS

| 2014/0192583 | A1* | 7/2014 | Rajan | ........................ | G11C 7/10 |
| | | | | | 365/63 |
| 2019/0180840 | A1 | 6/2019 | Kang et al. | | |
| 2023/0115494 | A1* | 4/2023 | Maheshwari | ....... | G06F 12/0284 |
| | | | | | 711/154 |

* cited by examiner

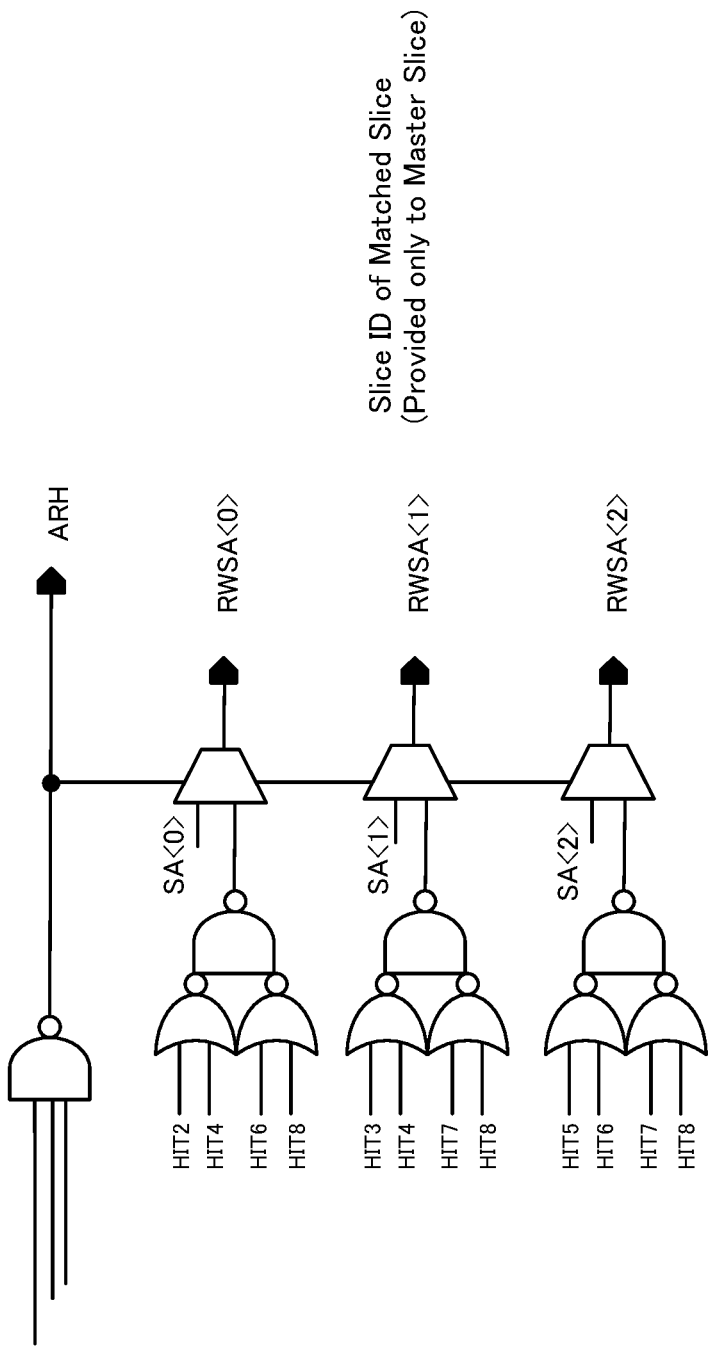

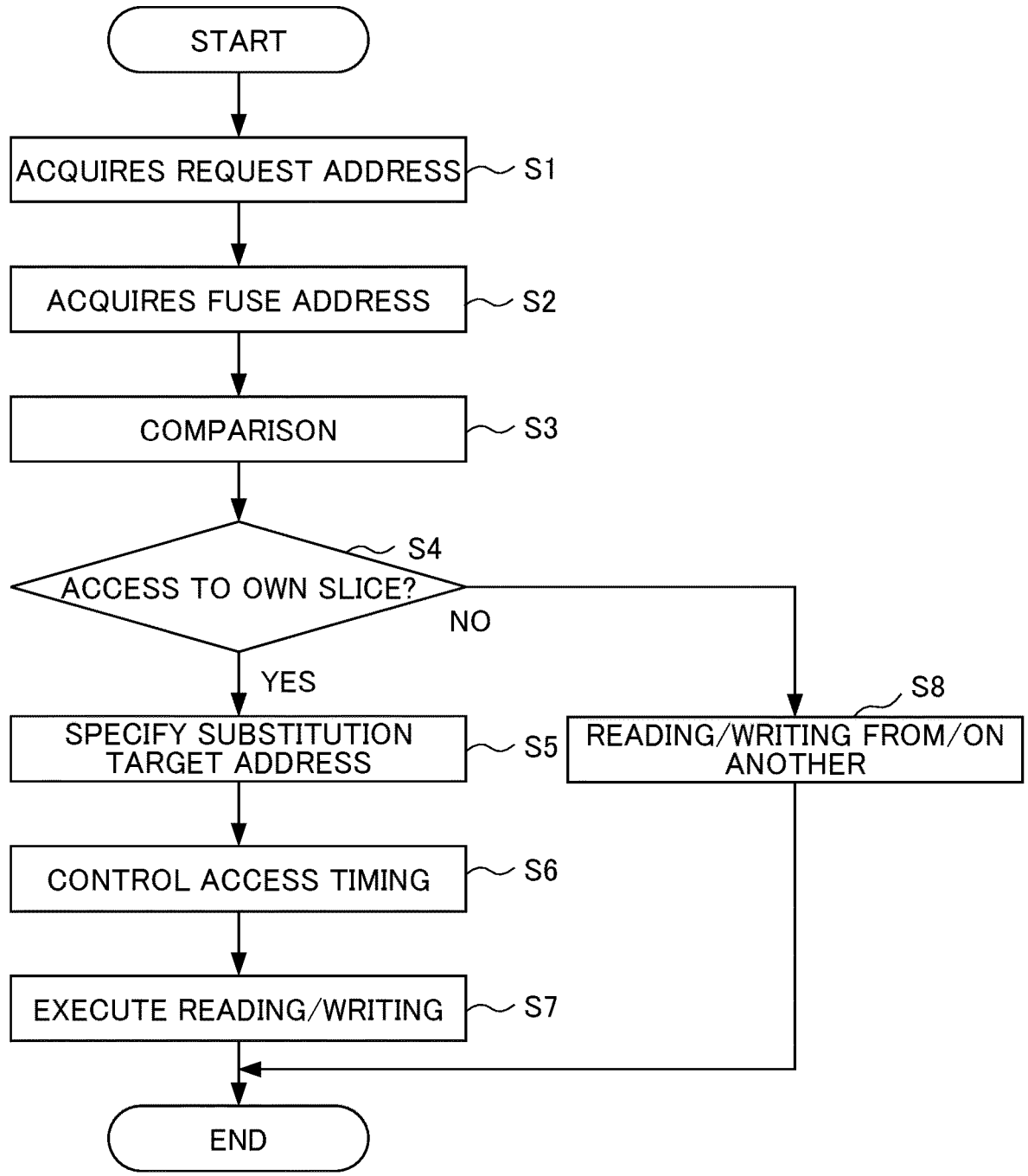

STACKED MEMORY AND MANUFACTURING METHOD THEREFOR

TECHNICAL FIELD

The present invention relates to a stacked memory and a method for manufacturing the stacked memory.

BACKGROUND ART

Conventionally, a volatile memory (RAM) such as a dynamic random access memory (DRAM) has been known as a storage device. The DRAM is required to have a large capacity such that it can support high performance of an arithmetic unit (hereinafter referred to as a logic chip) and an increase in an amount of data. For this reason, attempts have been made to increase the capacity by way of miniaturization of the memory (memory cell array, memory chip) and planar addition of cells. On the other hand, this type of increase in capacity is reaching its limit because of the miniaturization resulting in feebleness to noise, an increase in die area, and other factors.

Therefore, in recent years, a technique for achieving a large capacity by way of a three-dimensional (3D) structure that is formed by stacking a plurality of planar memories has been developed. Furthermore, a semiconductor module in which a plurality of stacked modules are electrically connected has been proposed (for example, see Patent Document 1).

Patent Document 1: Japanese Unexamined Patent Application (Translation of PCT Application), Publication No. 20112-505491

DISCLOSURE OF THE INVENTION

Problems to be Solved by the Invention

The semiconductor module of Patent Document 1 includes a plurality of dies having a non-defective cell, a defective cell, and a spare cell. In the semiconductor module of Patent Document 1, one of the plurality of dies functions as an interface die. The interface die includes components such as an I/O circuit and an interface I/O circuit. The interface die further includes a comparison circuit that compares the address of an access target with the address of the defective cell, for all the dies.

On the other hand, in Patent Document 1, the interface die controls all the dies. For this reason, the number of signal lines (the number of TSVs or micro bumps) from the interface die to the dies increases. As a result, the yield of the semiconductor module decreases. Patent Document 1 further discloses a semiconductor module in which each of dies has a comparison circuit, but information indicating which of the dies accesses the interface die is not provided. Therefore, Patent Document 1 does not disclose how the timing of the I/O operation of each die is controlled.

The present invention has been made in view of the above circumstances, and an object of the present invention is to provide a stacked memory which is capable of appropriately controlling operation timing and yield of which is improved, and to provide a method for manufacturing the stacked memory.

Means for Solving the Problems

The present invention relates to a stacked memory including a plurality of memory chips stacked together, the memory chips including: a memory unit that includes a plurality of memory cells, is capable of storing data, and has a regular memory block for use mainly in reading/writing of data and a spare memory block for substituting for a defective memory cell in the regular memory block; an address storage unit that stores, as a substitution source slice address, a slice address identifying the memory chip in which the regular memory block is to be substituted by the spare memory block, and stores, as a substitution source memory address, a memory address to be substituted, for at least two memory chips of the memory chips stacked together; a comparison unit that compares a request address indicating the slice address and the memory address of an access request destination with the substitution source slice address and the substitution source memory address; a specifying unit that specifies, based on a comparison result, the memory unit to which access is to be actually made and that generates an access timing; a timing control unit that selects either the access timing generated or an access timing transmitted from another memory chip, and controls access to the memory unit at the access timing selected; and an execution unit that executes reading/writing from/to the memory unit specified at the access timing selected.

The present invention further relates to a stacked memory including a plurality of memory chips stacked together, each of the memory chips including: a memory unit that includes a plurality of memory cells and is capable of storing data; a specifying unit that generates an access timing for accessing the memory unit; a timing control unit that selects either the access timing generated or an access timing transmitted from another memory chip, and controls access at the access timing selected; and an execution unit that executes reading/writing at the access timing selected.

The present invention further relates to stacked memory including a plurality of memory chips stacked together, each of the memory chips including: a memory unit that includes a plurality of memory cells, is capable of storing data, and has a regular memory block for use mainly in reading/writing of data and a spare memory block for substituting for a defective memory cell in the regular memory block; an address storage unit that stores, as a substitution source slice address, a slice address identifying the memory chip in which the regular memory block is to be substituted by the spare memory block, and stores, as a substitution source memory address, a memory address to be substituted, for all the memory chips stacked together; a comparison unit that compares a request address indicating the slice address and the memory address of an access request destination with the substitution source slice address and the substitution source memory address; a specifying unit that specifies, based on a comparison result, the memory unit to which access is to be actually made; and an execution unit that executes reading/writing from/to the memory unit specified.

Preferably, the timing control unit specifies an access destination slice based on a slice address of an access destination outputted from one of the memory chips different from the memory chip to which the timing control unit belongs.

Preferably, the timing control unit acquires, as an externally-provided instruction on an execution timing, a timing generated by one of the memory chips different from the memory chip to which the timing control unit belongs.

Preferably, the comparison unit outputs, as a comparison result, a signal indicating whether or not the regular memory block or the spare memory block of the memory chip to which the comparison unit belongs is to be used.

Preferably, each of the memory chips further includes a chip identification information storage unit that stores, as chip identification information, an individual slice address that is a slice address identifying the memory chip to which the chip identification information storage unit belongs. The comparison unit preferably includes a chip comparison unit that makes a comparison to determine whether or not the individual slice address matches a slice address included in the request address, and an address comparison unit that makes a comparison to determine whether or not the request address matches the substitution source address. The specifying unit preferably specifies the access destination address based on a comparison result.

Preferably, the regular memory block and the spare memory block each have a redundant memory cell capable of substituting for a defective memory cell of the memory block to which the regular memory block and the spare memory block belong.

The present invention further relates to a method for manufacturing the stacked memory. The method includes: a stacking step of stacking semiconductor wafers including the plurality of memory chips; a substitution step of substituting a defective memory cell of the regular memory block included in the semiconductor wafers stacked with a memory cell of the spare memory block; and a dicing step of dicing the memory chips stacked, the dicing step being performed after the substitution step.

Preferably, the method for manufacturing the stacked memory further includes, before the stacking step, an interconnection layer forming step of designating, by means of an interconnection layer, one semiconductor wafer for constituting a master chip from among all the semiconductor wafers to be staked, the master chip being capable of transmitting an access request and a timing signal to a rest of the semiconductor wafers stacked.

Preferably, the method for manufacturing the stacked memory further includes, after the stacking step and before the substitution step, a master chip designating step of designating one semiconductor wafer for constituting a master chip from among all the semiconductor wafers stacked, the master chip being capable of transmitting an instruction signal and a timing signal to a rest of the memory chips stacked.

Effects of the Invention

The present invention can provide a stacked memory which is capable of appropriately controlling operation timing and yield of which is improved, and a method for manufacturing the stacked memory.

BRIEF DESCRIPTION OF THE DRAWINGS

FIG. 5 is a circuit diagram illustrating a read/write slice address generation circuit of a master chip of the stacked memory according to the embodiment; and FIG. 6 is a flowchart showing a flow of manufacture of the stacked memory according to the embodiment.

PREFERRED MODE FOR CARRYING OUT THE INVENTION

Figure 1:
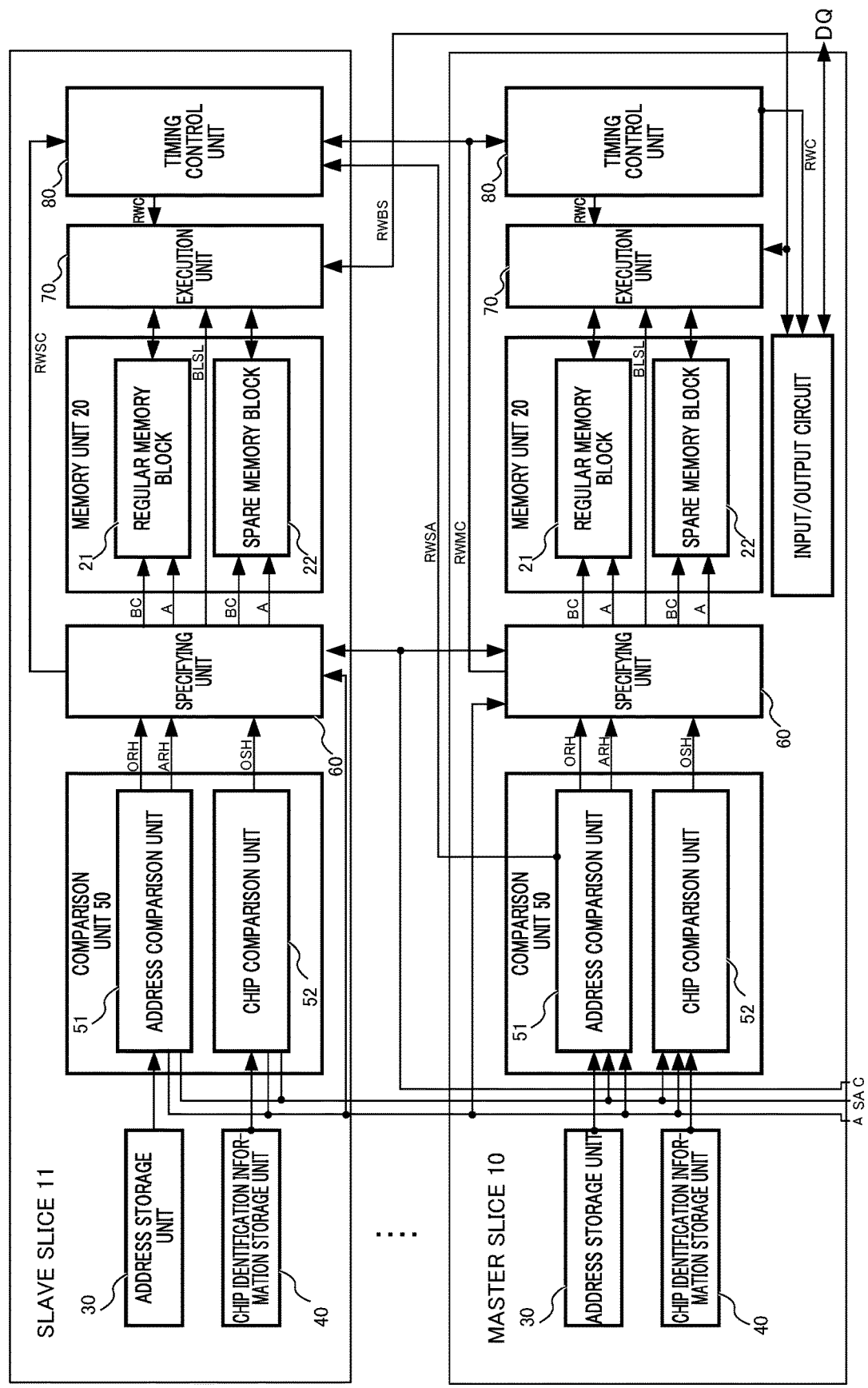
FIG. 1 is a block diagram illustrating a configuration of a stacked memory according to an embodiment of the present invention.

A stacked memory 1 according to an embodiment of the present invention and a method for manufacturing the stacked memory 1 will be described with reference to FIGS. 1 to 6. The stacked memory 1 according to the present embodiment includes, for example, a plurality of memory chips stacked together. As illustrated in FIG. 1, the stacked memory 1 is formed by stacking n memory chips (n is a natural number equal to or greater than 2). In the present embodiment, one of the memory chips operates as a master slice 10 including an input/output circuit capable of transmitting and receiving an input/output signal DQ to and from an external device. The master slice 10 operates to be able to transmit, to the rest of the memory chips, a slice address indicating a slice on which a memory unit 20 selected by a comparison unit 50 is present. The master slice 10 operates to be able to transmit, to the rest of the memory chips, a timing signal indicating a read/write timing. The memory chips other than the master slice 10 operate as slave slices 11 capable of receiving the slice address and the timing signal transmitted from the master slice 10.

In the present embodiment, each memory chip has a main memory area (regular memory block 21) and a spare memory area (spare memory block) by which a defective memory cell in the main memory area (regular memory block 21) can be substituted. In particular, in the present embodiment, each memory chip substitutes its own spare memory block 22 or the spare memory block 22 of another memory chip for a defective memory cell in its own regular memory block 21. Each memory chip selectively determines whether to use its own regular memory block 21, its own spare memory block 22, or the spare memory block 22 of another memory chip, according to an input of the address of an access destination. Each memory chip makes access in response to selection of its own regular memory block 21 or its own spare memory block 22. In this way, each memory chip individually determines the address of an access destination without depending on the master slice 10.

The configuration of the master slice 10 is different from that of the slave slice 11 in that the master slice 10 includes external terminals (i.e., input circuits for a command (denoted by C), an address (denoted by A), and a slice address (denoted by SA)) capable of communicating with an external device. Furthermore, the configuration of the master slice 10 is different from that of the slave slice 11 in that the master slice 10 is capable of transmitting the slice address of an access destination (a slice address of a semiconductor chip to be read/written) and a timing signal to the slave slices 11. In the following description of the configuration, components common to the master slice 10 and the slave slices 11 will be described as the components of the slave slice 11. In the following embodiment, a case where the stacked memory 1 includes eight memory chips stacked together will be described as an example. Among the components of the slave slice 11, components specific to the master slice 10 will be separately described.

Next, the structure of the memory chips constituting the stacked memory 1 according to the present embodiment will be described. As illustrated in FIG. 1, each memory chip includes a memory unit 20, an address storage unit 30, a chip identification information storage unit 40, a comparison unit 50, a specifying unit 60, a timing control unit 80, and an execution unit 70.

The memory unit 20 is, for example, a memory block constituted by memory cells. That is, the memory unit 20 is capable of storing data. The memory unit 20 includes a regular memory block 21 and a spare memory block 22.

Figure 2:
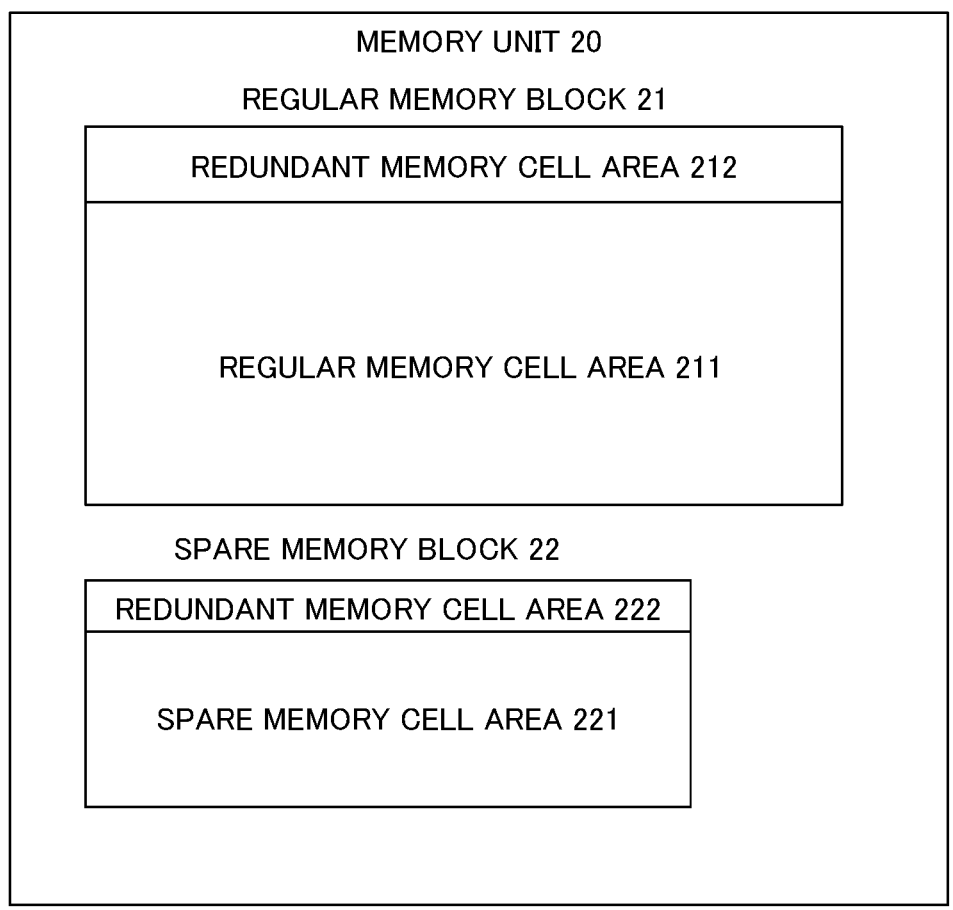
FIG. 2 is a schematic diagram illustrating memory cells belonging to a regular memory block and a spare memory block of the stacked memory according to the embodiment.

The regular memory block 21 is a memory area that is mainly used for reading/writing data. Therefore, the regular memory block 21 has the largest storage capacity in the memory chip. As illustrated in FIG. 2, the regular memory block 21 of the present embodiment includes a regular memory cell area and a redundant memory cell area. The regular memory cell area is for use for ordinary reading/writing. The redundant memory cell area can substitute for a defective memory cell in the regular memory cell area. That is, the regular memory block 21 includes the redundant memory cell capable of substituting for a defective memory cell in the regular memory block 21. For example, in a case where a defective memory cell in the regular memory cell area cannot be substituted by the redundant memory cell area, the regular memory block 21 can be substituted by the spare memory block 22 described below.

The spare memory block 22 is a memory area for substituting for a defective memory cell in the regular memory block 21. Therefore, the spare memory block 22 has a smaller storage capacity than the regular memory block 21. In the present embodiment, the spare memory block 22 is capable of substituting, for example, for a certain proportion of the memory area of the regular memory block 21. The spare memory block 22 is configured to substitute, for example, for a memory area having a capacity of 1/16 including a defective memory cell, of the memory area of the regular memory block 21. Similarly to the regular memory block 21, the spare memory block 22 includes a redundant memory cell. For example, the spare memory block 22 substitutes its own spare memory cell area for a defective memory cell area in the regular memory block 21. In a case where a defective memory cell is present in its own spare memory cell area, the spare memory block 22 substitutes its own redundant memory cell area for the defective memory cell.

Figure 3:
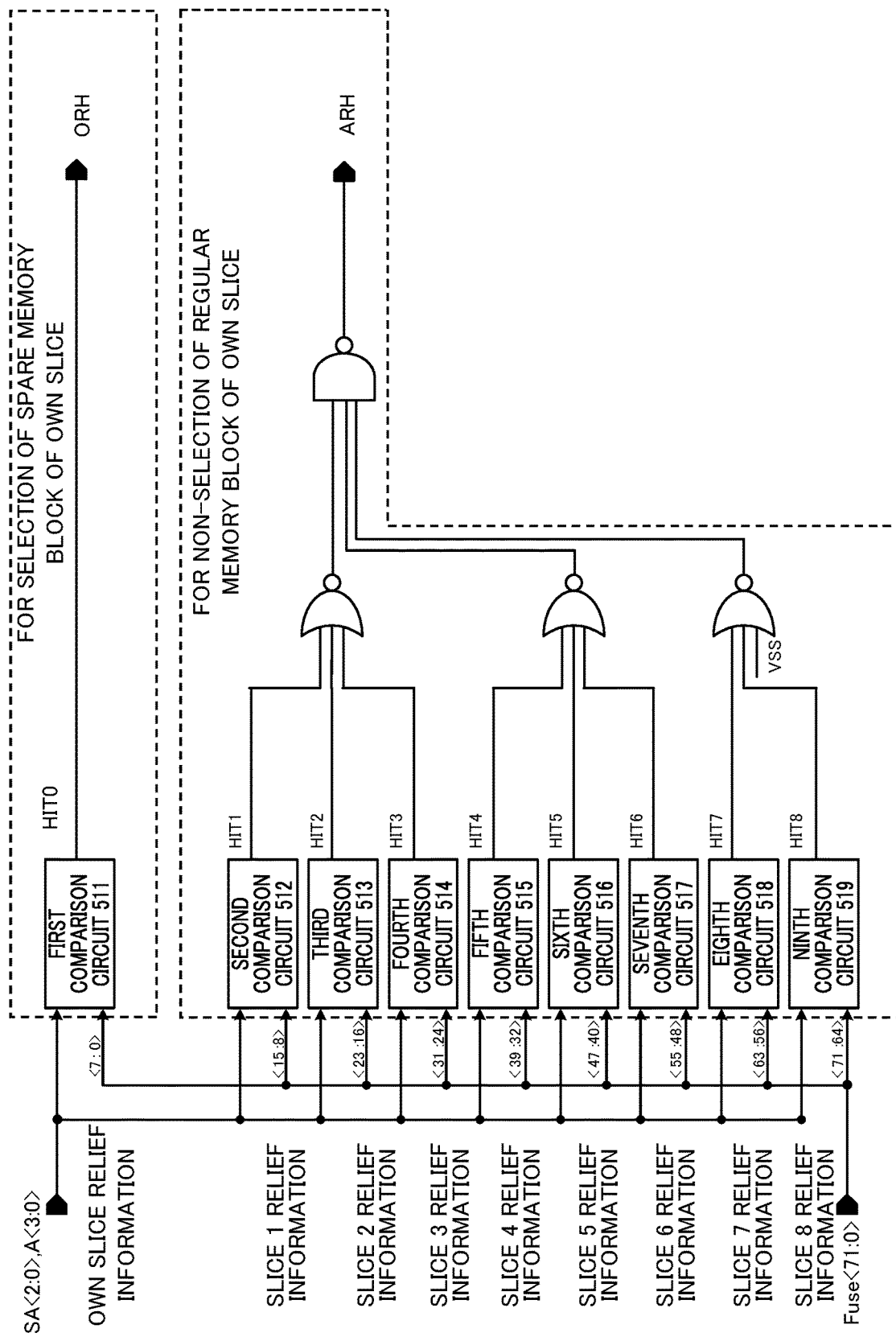
FIG. 3 is a circuit configuration diagram illustrating an address comparison unit of the stacked memory according to the embodiment.

The address storage unit 30 includes, for example, a fuse element. For all the stacked memory chips, the address storage unit 30 stores, as a substitution source slice address, a slice address identifying each memory chip in which the regular memory block 21 is to be substituted by the spare memory block 22, and stores, as a substitution source address, the memory address to be substituted. FIG. 3 illustrates these pieces of stored information as slice 1 relief information to slice 8 relief information. Furthermore, for each slice, the address storage unit 30 stores, as a substitution source slice address, a slice address identifying a substitution source memory chip that is to be substituted by the slice to which the address storage unit 30 belongs. Specifically, for each slice, the address storage unit 30 stores, as the substitution source slice address, a slice address identifying a memory chip that includes a substitution source regular memory block 21 having an area with a defective memory cell and that is substituted by the slice to which the address storage unit 30 belongs. Furthermore, for each slice, the address storage unit 30 stores, as a substitution source memory address, an access destination address indicating the substitution source regular memory block 21 that has an area with a defective memory cell and that is substituted by the slice to which the address storage unit 30 belongs. FIG. 3 illustrates these pieces of stored information as own-slice relief information.

In the present embodiment, the address storage unit 30 stores, for example, an 8-bit address as a defect address indicating an area including a defective memory cell of the substitution source. This is shown as relief information in FIG. 3. The address storage unit 30 stores an address composed of, for example, one bit indicating whether to enable or disable the address stored in the address storage unit 30, three bits indicating an address corresponding to an address specifying a memory chip to be substituted (hereinafter referred to also as a defective slice address), and four bits indicating a memory address specifying a memory area to be substituted (hereinafter referred to also as a defective memory address). The address storage unit 30 stores, for example, the upper 4-bit address of the defective memory cell as an address specifying a memory area to be substituted. Thereby, the address storage unit 30 stores the address corresponding to a 1/16 area including the defective memory cell, of the regular memory block 21. The address storage unit 30 of each slice stores a 72-bit address in total that is composed of 64 bits (8 slices×8 bits) of the relief information regarding all the slices, and 8 bits of own slice relief information indicating the substitution source to be substituted by the slice to which the address storage unit 30 belongs.

The chip identification information storage unit 40 includes, for example, a fuse element. The chip identification information storage unit 40 stores chip identification information for identifying the memory chip. For example, the chip identification information storage unit 40 stores, as the chip identification information, an individual slice address that is a slice address identifying the memory chip to which the chip identification information storage unit 40 belongs.

The comparison unit 50 is, for example, an electronic circuit. The comparison unit 50 compares a request address indicating the slice address and the memory address of an access request destination with the substitution source address. The comparison unit 50 acquires information regarding the memory chip of the access destination (hereinafter referred to also as a slice address SA) and a memory address (hereinafter referred to also as a memory address A) of the access destination. For example, the comparison unit 50 acquires the slice address SA and the memory address A of an access target that is requested from an external device. The comparison unit 50 compares the acquired slice address SA with the slice address of the slice to which the comparison unit 50 belongs, which is included in the chip identification information. The comparison unit 50 then compares the memory address A of the access destination with the substitution source memory address. In this way, the comparison unit 50 outputs a signal indicating whether or not the regular memory block 21 or the spare memory block 22 of the memory chip to which the comparison unit 50 belongs is to be used, as a comparison result. Specifically, for example, the comparison unit 50 outputs, as the comparison result, whether or not access is to be made to the regular memory block 21 of the memory chip to which the comparison unit 50 belongs or the regular memory block 21 of another memory chip and whether or not access is to be made to the spare memory block 22 of the memory chip to which the comparison unit 50 belongs or the spare memory block 22 of another memory chip. The comparison unit 50 includes a chip comparison unit 52 and an address comparison unit 51.

The chip comparison unit 52 acquires the slice address of the slice to which the chip comparison unit 52 belongs, from the chip identification information stored in the chip identification information storage unit 40. The chip comparison unit 52 compares the acquired slice address that identifies the memory chip to which the chip comparison unit 52 belongs, with the slice address SA of the memory chip requested as the access destination. As a result of the comparison, the chip comparison unit 52 provides an output as to whether or not access is to be made to the memory chip to which the chip comparison unit 52 belongs. In a case where the slice address SA coincides with the information indicating the memory chip of the access destination, the chip comparison unit 52 outputs a comparison result own-slice-hit (OSH) signal indicating that access is to be made to the memory chip to which the chip comparison unit 52 belongs. In a case where the slice address of the slice to which the chip comparison unit 52 belongs, which is stored in the chip identification information storage unit, is different from the slice address SA of the memory chip requested as the access destination, the chip comparison unit 52 does not output the comparison result OSH signal because access is not to be made to the memory chip to which the chip comparison unit 52 belongs.

The address comparison unit 51 compares the address A and the slice address SA of the memory chip as the access destination acquired from an external device, with the substitution source address that is substituted by the slice to which the address comparison unit 51 belongs and the substitution source addresses that are substituted by the other slices, which are acquired from the address storage unit 30. In the present embodiment, the address comparison unit 51 compares the upper four bits of the address A of the access destination acquired from the external device, with the substitution source memory address. The address comparison unit 51 compares the slice address A with the substitution source slice address. The address comparison unit 51 outputs, as a comparison result, a signal indicating whether or not the spare memory block 22 of the memory chip to which the address comparison unit 51 belongs is to be used (hereinafter, referred to also as an own-redundancy-hit (ORH) signal) and a signal indicating whether or not the regular memory block 21 of the memory chip to which the address comparison unit 51 belongs is to be used (any-redundancy-hit (ARH) signal).

For example, the address comparison unit 51 includes a plurality of comparison circuits as illustrated in FIG. 3. The comparison circuits are provided in accordance with the number of memory chips. In the present embodiment, in accordance with the eight stacked memory chips, the address comparison unit 51 includes one comparison circuit for outputting the ORH signal and eight comparison circuits for outputting the ARH signal. Specifically, the address comparison unit 51 includes a first comparison circuit that makes comparison as to whether or not to the spare memory block 22 of the memory chip to which the address comparison unit 51 belongs is to be used, and second to ninth comparison circuits that make comparison as to whether or not to use one of the spare memory blocks 22 of the eight memory chips. The address comparison unit 51 outputs, as the ORH signal, a result from the first comparison circuit. The address comparison unit 51 uses a gate circuit to output, as the ARH signal, a logical sum of output results from the second to ninth comparison circuits.

The first comparison circuit 511 outputs, as a comparison result, whether or not the spare memory block 22 of the memory chip to which that first comparison circuit 511 belongs is to be used. The first comparison circuit 511 acquires the request address and acquires a substitution source fuse address that is substituted by the slice to which the first comparison circuit 511 belongs, from the address storage unit 30. The first comparison circuit 511 compares the request address with the substitution source fuse address, and outputs, as a comparison result ORH signal, whether or not the spare memory block 22 of the memory chip to which the first comparison circuit 511 belongs is to be used. Specifically, in a case where the request memory address matches the substitution source slice address and the substitution source memory address, the first comparison circuit 511 outputs, as the comparison result, an ORH signal (high signal) indicating that the spare memory block 22 of the memory chip to which the first comparison circuit 511 belongs is to be used.

The second comparison circuit 512 to the ninth comparison circuit 519 output, as a respective comparison result, whether or not the spare memory blocks 22 provided in the stacked memory 1, which include the spare memory blocks 22 of the memory chips to which the second to ninth comparison circuits belong, are to be used. In the present embodiment, each of the second comparison circuit 512 to the ninth comparison circuit 519 outputs, as a comparison result, whether or not the spare memory block 22 of one of the eight stacked memory chips is to be used. The second comparison circuit 512 to the ninth comparison circuit 519 are provided in association with the eight memory chips on a one-to-one basis. For example, the second comparison circuit 512 to the ninth comparison circuit 519 output, as a respective comparison result, whether or not the spare memory block 22 of one of the first memory chip (master slice 10), the second memory chip (slave slice 11), . . . , and the eighth memory chip (slave slice 11) stacked in order is to be used. The second comparison circuit 512 to the ninth comparison circuit 519 each compare a request address with the substitution source slice address and the substitution source memory address that are to be substituted by each of the eight memory chips to thereby determine whether or not they match each other. In fuse information stored in the address storage unit 30 of each chip, bits 0 to 7 corresponding to the first comparison circuit 511 constitute the substitution source address to be substituted by the chip and are value unique to each of the eight memory chips. On the other hand, bits 8 to 71 corresponding to the second comparison circuit 512 to the ninth comparison circuit 519 are the same values common to all the eight memory chips.

For example, the second comparison circuit 512 compares a request address with the substitution source slice address and the substitution source memory address that are to be substituted by a slice 1, and thereby check whether or not they match each other. When the substitution source memory address and the substitution source slice address both match the request address, the second comparison circuit 512 outputs a signal HIT1 indicating "High" as a comparison result. The third comparison circuit to ninth comparison circuit 519 output "High" or "Low" as a respective comparison result based on a comparison of the request address with the substitution source address and the substitution source slice address that are substituted by each of slices 2 to 8. That is, in a case where one of the spare memory blocks 22 of the stacked memory 1 is to be used, one of the second comparison circuit 512 to the ninth comparison circuit 519 outputs a High signal. As a result, the second comparison circuit 512 to the ninth comparison circuit 519 output a High signal as the ARH signal. On the other hand, when the spare memory blocks 22 of the stacked memory 1 are not to be used, the second comparison circuit 512 to the ninth comparison circuit 519 all output a Low signal. As a result, the second comparison circuit 512 to the ninth comparison circuit 519 output a Low signal as the ARH signal. In other words, in a case where the second comparison circuit 512 and the ninth comparison circuit 519 output a High signal as the ARH signal in response to a request address, one of the spare memory blocks 22 of the stacked memory 1 is used, and thus, this case means that none of the regular memory blocks 21 of the eight memory chips is used. On the other hand, a case where a Low signal is outputted as the ARH signal indicates that one of the regular memory blocks 21 of the stacked memory 1 is used.

Figure 4:
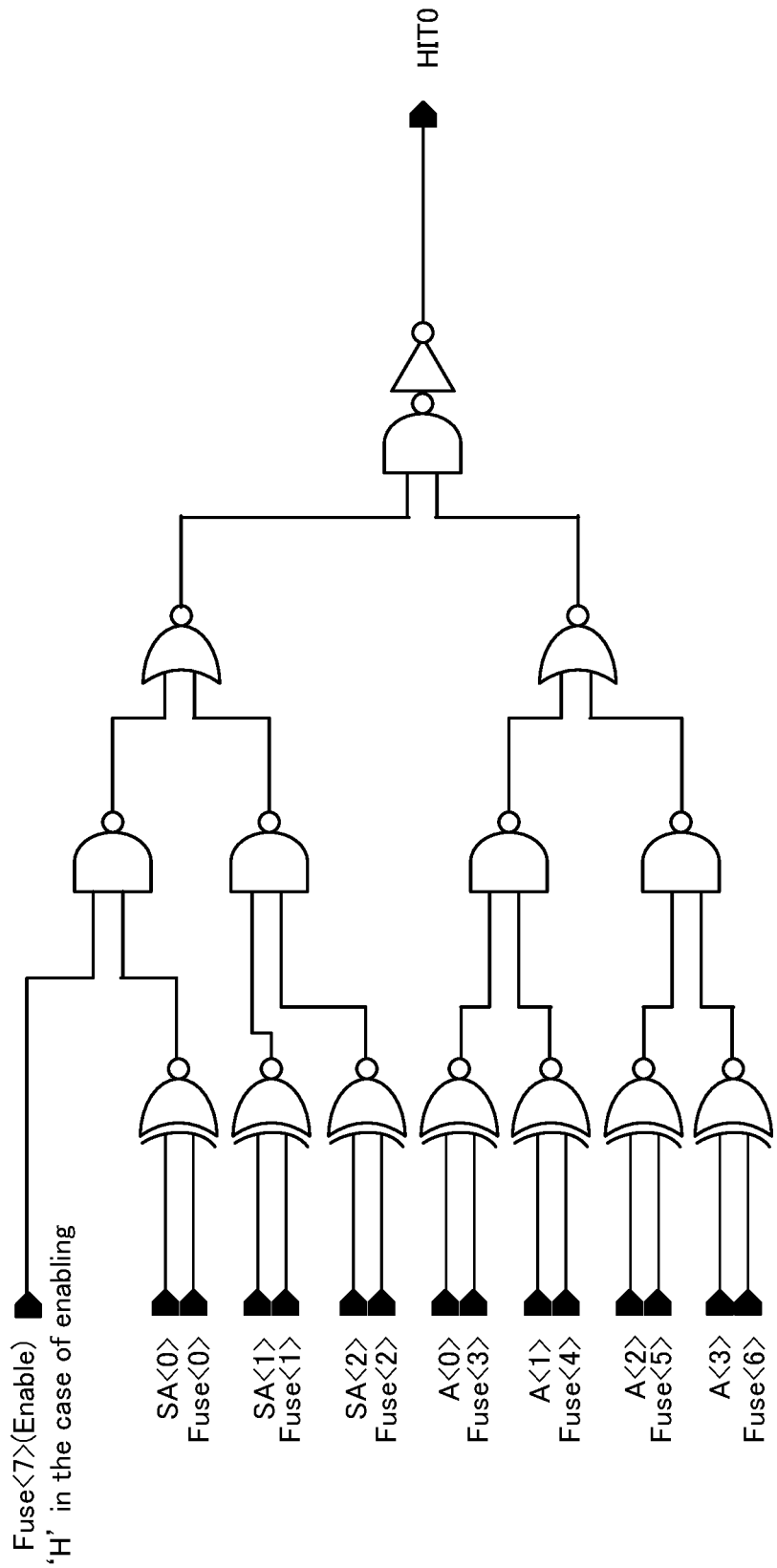
FIG. 4 is a circuit configuration diagram illustrating a fuse comparison unit that is an element of the unit of FIG. 3.

As illustrated in FIG. 4, each of the first comparison circuit 511 to the ninth comparison circuit 519 is constituted by a combination of an XNOR gate, an NAND gate, an NOR gate, and an NOT gate. The address comparison unit 51 outputs a signal (ORH signal in FIG. 3) indicating selection of a substitution block of the memory chip to which the address comparison unit 51 belongs, and a signal (ARH signal in FIG. 3) indicating whether or not the regular block of the memory chip to which the address comparison unit 51 belongs is to be used. The address comparison unit 51 of the master slice 10 outputs, in addition to the foregoing signals, a slice address of a substitution target in a case where a spare block is to be used, and a requested slice address SA (RWSA<2:0> in FIG. 5) in a case where no spare block is to be used. The address comparison unit 51 outputs an enable signal (HIT0 with a value of 1 in FIG. 4) when the spare memory block 22 of the memory chip to which the address comparison unit 51 belongs is to be substituted. Then, as illustrated in FIG. 3, the first address comparison circuit outputs a signal (ORH signal) for selecting the spare memory block 22 of the memory chip to which the first address comparison circuit belongs. The second to ninth comparison circuits 512 to 519 output a signal (ARH signal) indicating that the spare memory block 22 of one of the memory chips is selected. Here, Fuse<7> denotes enable information that is set to Low when the spare block in the corresponding slice is not used, and to High when the spare block in the corresponding slice is used.

As illustrated in FIG. 5, the comparison circuit of the master slice 10 includes a chip specifying circuit that specifies a memory chip to be actually read/written. Based on HIT1 to HIT8, the chip specifying circuit encodes remaining signals excluding HIT1, and thereby specifies a memory chip that is to be actually read/written. A chip comparison circuit includes an NOR gate, an NAND gate, and a multiplexer. When the signal (ARH), which indicates selection of the spare memory block 22 of one of the memory chips, is High, the chip comparison circuit specifies an individual slice address to be actually accessed, instead of a chip address for which an external device has made an access request. When the signal (ARH) for selecting the spare memory block 22 of one of the memory chips is Low, the chip comparison circuit outputs the slice address SA for which an external device has made an access request.

The specifying unit 60 is, for example, an electronic circuit. The specifying unit 60 specifies a memory unit 20 to be actually accessed, based on a comparison result. The specifying unit 60 generates an access timing for the specified memory unit 20. Furthermore, the specifying unit 60 sends the generated access timing to the timing control unit 80 (RWSC: R/W Slave Control). The specifying unit 60 specifies a memory unit 20 of an access destination, based on an ORH signal, an ARH signal, an ASH signal, a command, and the memory address of the access request destination that are outputted. The operation of the specifying unit 60 can be classified as follows.

(i) Case where ORH=High

In the case where the ORH signal is "High", the specifying unit 60 specifies the spare memory block 22 of the memory chip to which the specifying unit 60 belongs as the memory unit 20 of the access destination. The specifying unit 60 specifies the spare memory block 22 of the memory chip to which the specifying unit 60 belongs as the memory unit 20 of the access destination, regardless of the output result of the OSH signal.

(ii) Case where ORH (Use of the Spare Memory Block 22 of the Memory Chip of the Specifying Unit)=Low, and ARH (Use of the Spare Memory Block 22 of Another Memory Chip)=High In the case where the ORH signal is "Low" and the ARH signal is "High", the specifying unit 60 specifies that the spare memory block 22 of the memory chip to which the specifying unit 60 belongs is not to be used, and the spare memory block 22 of another memory chip is to be used. In this case, the specifying unit 60 specifies that no access is made to the memory chip to which the specifying unit 60 belongs. The specifying unit 60 specifies that the memory unit 20 of the memory chip to which the specifying unit 60 belongs is not to be used, regardless of the output result of the OSH signal.

(iii) Case where ORH=Low, ARH=Low, and OSH (Use of the Memory Chip of the Specifying Unit)=High In the case where the ORH signal is "Low", the ARH signal is "High", and the OSH signal is "High", the specifying unit 60 specifies the regular memory block 21 of the memory chip to which the specifying unit 60 belongs as the memory unit 20 of the access destination. The specifying unit 60 specifies the memory address included in the request address to be the memory address of the access destination.

(iv) Case where ORH=Low, ARH=Low, and OSH=LOW

In the case where the ORH signal is "Low", the ARH signal is "High", and the OSH signal is "Low", the specifying unit 60 specifies that the memory unit 20 of the memory chip to which the specifying unit 60 belongs is not to be used, and the regular memory block 21 of another memory chip is to be used. In this case, the specifying unit 60 specifies that no access is made to the memory chip to which the specifying unit 60 belongs.

The specifying unit 60 of the master slice 10 is capable of transmitting an access timing also to the slave slices 11 (RWMC: R/W Master Control). The specifying unit 60 is capable of transmitting the access timing to the timing control unit 80 of the master slice 10. Furthermore, the specifying unit 60 executes reading/writing from/to the memory unit 20 in accordance with a read/write instruction from an external device.

The execution unit 70 is, for example, an electronic circuit. The execution unit 70 transmits/receives read/write data to/from a specified access destination address. The execution unit 70 transmits/receives read/write data to/from the input/output circuit of the master slice 10. For example, the execution unit 70 acquires information indicating an access destination memory block that has been specified by the specifying unit 60, and accesses the access destination memory block indicated by the acquired information. The execution unit 70 is capable of transmitting/receiving read/write data to/from the input/output circuit of the master slice 10 (RWBS: R/W Bus).

The timing control unit 80 is, for example, an electronic circuit. The timing control unit 80 outputs a timing signal RWC (R/W control) so as to control the execution timing of the execution unit 70. The timing control unit 80 acquires a timing generated by another memory chip as an execution timing from an external device. The timing control unit 80 acquires, for example, a read/write instruction (R/W Master Control: RWMC in FIG. 1) outputted from the master slice 10 as an externally-provided execution timing. The timing control unit 80 receives, for example, an access timing (R/W Slave Control: RWSC in FIG. 1) that is outputted from the specifying unit 60 and is unique to each slice. The timing control unit 80 causes the execution unit 70 to transmit/receive read/write data at a timing predetermined (preselected) from the instruction signal RWMC as the externally-provided execution timing or the instruction signal RWSC as the execution timing outputted from the specifying unit 60 of the memory chip to which the timing control unit 80 belongs. That is, after the access destination address is specified, the timing control unit 80 controls timing such that reading/writing is executed at the timing when the predetermined one of the signals is received. For example, the timing control unit 80 controls the timing such that read/write data is transmitted/received at the timing when the slower signal is received. As illustrated in FIG. 5, the timing control unit 80 controls transmission/reception of read/write data by the execution unit 70 based on the slice address of an access destination outputted from the specifying unit 60 of the master slice 10.

In the master slice 10, the execution unit 70 is connected to an input/output circuit (RWBS: R/W Bus). The timing control unit 80 is connected to the execution unit 70 (RWC: R/W Control). The input/output circuit is connected to, and capable of communicating with, an external device (DQ).

Next, the operation that the stacked memory 1 of the present embodiment performs will be described with reference to the flowchart of FIG. 6. First, the comparison unit 50 acquires a request address (Step S1). Next, the comparison unit 50 acquires a fuse address (Step S2). Next, the comparison unit 50 compares the request address with the fuse address (Step S3).

Based on a result of the comparison, the specifying unit 60 determines whether or not the access is to be made to the slice to which the specifying unit 60 belongs (Step S4). When the access is to be made to the slice to which the specifying unit 60 belongs (Yes in Step S4), the processing proceeds to Step S5. On the other hand, when the access is not to be made to the slice to which the specifying unit 60 belongs (No in Step S4), the processing proceeds to Step S8.

In Step S5, the specifying unit 60 specifies the memory address of the regular memory block or the memory address of the spare memory block. Next, the timing control unit 80 controls the access timing at which the access is made to the specified memory address (Step S6). Next, the execution unit 70 executes transmission/reception of read/write data to the memory address specified at the controlled access timing, and executes transmission/reception of read/write data to/from the input/output circuit of the master slice 10 (Step S7). Thus, the processing according to this flow ends.

In Step S8, reading/writing is executed on another memory chip. Thus, the processing according to this flow ends.

Next, a method for manufacturing the stacked memory 1 will be described. Wafers to be used to form the stacked memory 1 are determined by way of a simplified test conducted on the wafers before being processed. Thereafter, an interconnection pattern is formed on the wafers in order to identify a master chip and a slice address, or a program is executed by a fuse element or the like. Then, relief determination is made as to the regular block and the spare block on a slice. If further relief is required, relief determination is made between slices. Specifically, the method for manufacturing the stacked memory 1 includes a wafer test step, an interconnection layer forming step, a program step using a fuse or the like, a stacking step, a substitution step, and a dicing step.

In the wafer test step, the simplified test is conducted on the wafers in a single-layer wafer state. In the wafer test step, for example, a test is performed to check a large current defect. By way of the wafer test step, a wafer with a high defect rate is excluded.

In the interconnection layer forming step or the program step, one semiconductor wafer for constituting a master chip, which is capable of transmitting an access request and a timing signal to the rest of the stacked memory chips, is designated from among all the semiconductor wafers to be stacked. In the interconnection layer forming step or the program step, the wafer to constitute the master chip is designated, by means of an interconnection mask layer for master chip, which is different from those of the other semiconductor wafers that constitute the stacked memory. Furthermore, in the interconnection layer forming step or the program step, slice addresses are determined for all the semiconductor wafers to be stacked.

In the stacking step, the semiconductor wafers including a plurality of memory chips are stacked. In the stacking step, for example, the wafer including the master chip and the wafers including slave chips are stacked.

In the substitution step, a defective memory cell in a regular memory block 21 included in the stacked semiconductor wafers is substituted by a memory cell of a spare memory block 22. In the substitution step, a wafer test is performed, and a defective memory cell in a regular memory block 21 of a chip is detected. In the substitution step, for example, a defective memory cell is substituted by a spare memory cell of the same chip. In the substitution step, in a case where substitution by a spare memory cell of the same chip is impossible, the defective memory cell is substituted by a spare memory of another stacked memory chip. In the substitution step, substitution source addresses are stored in the address storage units 30 of all the stacked chips.

The dicing step is performed after the substitution step. In the dicing step, the stacked memory chips are diced. In the dicing step, the stacked memory 1 resulting from the dicing is tested. In the dicing step, when a defective memory cell is detected in a regular memory block 21, it is determined whether or not the defective memory chip can be substituted by a spare memory cell of the stacked chips. In the dicing step, when the substitution is possible, the address storage unit 30 stores the substitution source address. On the other hand, in the dicing step, when the substitution is impossible, the stacked memory 1 is determined to be defective. In the dicing step, when no defective memory cell is detected or a defective memory is substitutable, the stacked memory 1 is determined to be a non-defective product.

The stacked memory 1 and the manufacturing method thereof according to the embodiment described above exert the following effects.

(1) The stacked memory 1 includes a plurality of memory chips stacked together, and the memory chips includes: the memory unit 20 that includes a plurality of memory cells, is capable of storing data, and has the regular memory block 21 for use mainly in reading/writing of data and the spare memory block 22 for substituting for a defective memory cell in the regular memory block 21; the address storage unit 30 that stores, as a substitution source slice address, a slice address identifying the memory chip in which the regular memory block 21 is to be substituted by the spare memory block 22, and stores, as a substitution source memory address, a memory address to be substituted, for at least two memory chips of the stacked memory chips; the comparison unit 50 that compares a request address indicating a slice address and a memory address of an access request destination with the substitution source slice address and the substitution source memory address; the specifying unit 60 that specifies, based on a comparison result, a memory unit 20 to which access is to be actually made and that generates an access timing; the timing control unit 80 that selects either the generated access timing or an access timing transmitted from another memory chip and controls access to the memory unit 20 at the selected access timing; and the execution unit 70 that executes reading/writing from/to the memory unit 20 specified at the selected access timing. This feature makes it possible to improve the yield. Furthermore, selecting the access timing makes it possible to suitably control the operating timing.

(2) The stacked memory 1 includes a plurality of memory chips stacked together, and each of the memory chips includes: the memory unit 20 that includes a plurality of memory cells and is capable of storing data; the specifying unit 60 that generates an access timing for accessing the memory unit 20; the timing control unit 80 that selects either the generated access timing or an access timing transmitted from another memory chip, and controls access at the selected access timing; and the execution unit 70 that executes reading/writing at the selected access timing. This feature makes it possible to select a timing suitable for reading/writing from/to the memory chip. Therefore, flexibility can be improved.

(3) The stacked memory 1 includes a plurality of memory chips stacked together, and each of the memory chips includes: the memory unit 20 that includes a plurality of memory cells, is capable of storing data, and has the regular memory block 21 for use mainly in reading/writing of data and the spare memory block 22 for substituting for a defective memory cell in the regular memory block 21; the address storage unit 30 that stores, as a substitution source slice address, a slice address identifying a memory chip in which the regular memory block 21 is to be substituted by a spare memory block 22, and stores, as a substitution source memory address, a memory address to be substituted, for all the memory chips stacked together; the comparison unit 50 that compares a request address indicating a slice address and a memory address of an access request destination with the substitution source slice address and the substitution source memory address; the specifying unit 60 that specifies, based on a comparison result, a memory unit 20 to which access is to be actually made; and the execution unit 70 that executes reading/writing from/to the specified memory unit 20. This feature makes it possible to substitute the spare memory block 22 of one of the plurality of memory chips for a defective memory cell in the regular memory block 21. Thus, the yield of the stacked memory 1 can be improved.

(4) The timing control unit 80 specifies an access destination slice based on a slice address of an access destination outputted from one of the memory chips different from the memory chip to which the timing control unit 80 belongs. Due to this feature, the access destination slice can be easily specified based on a command from another memory block.

(5) The timing control unit 80 acquires, as an externally-provided instruction on an execution timing, a timing generated by one of the memory chips different from the memory chip to which the timing control unit 80 belongs. Due to this feature, the flexibility of access to the memory can be improved in accordance with the characteristics of the memory.

(6) The comparison unit 50 outputs, as the comparison result, a signal indicating whether or not the regular memory block 21 or the spare memory block 22 of the memory chip to which the comparison unit 50 belongs is to be used. This feature makes it possible for each memory chip to determine whether or not the memory unit 20 is to be used. Thus, the number of communication paths between the memory chips can be reduced.

Each of the memory chips further includes the chip identification information storage unit 40 that stores, as chip identification information, an individual slice address that is a slice address identifying the memory chip to which the chip identification information storage unit 40 belongs. The comparison unit 50 includes the chip comparison unit 52 that makes a comparison to determine whether or not the individual slice address matches a slice address included in the request address, and the address comparison unit 51 that makes a comparison to determine whether or not the request address matches a substitution source address, and the specifying unit 60 specifies an access destination address based on a comparison result. This feature makes it possible for each memory chip to easily determine whether or not the access is made to the memory chip.

The regular memory block 21 and the spare memory block 22 each have a redundant memory cell capable of substituting for a defective memory cell of the memory block to which the regular memory block 21 and the spare memory block 22 belong. Thus, in a case where a small number of defective memory cells are present, the redundant memory block can be used before using the spare memory block 22. Thus, the yield of the stacked memory 1 can be further improved.

It should be noted that the present invention is not limited to the above-described preferred embodiment of the stacked memory 1 and the manufacturing method thereof, and appropriate modifications can be made to the present invention.

For instance, in the above embodiment, the master chip and the slave chips are designated in the interconnection layer forming step, but this is a non-limiting example. Instead of the interconnection mask forming step, a master chip designation step may be performed after the stacking step and before the substitution step. In the master chip designating step, one semiconductor wafer for constituting the master chip, which is capable of transmitting an instruction signal and a timing signal to the rest of the staked memory chips, is designated from among all the stacked semiconductor wafers.

In the above embodiment, the other wafer chips are, for example, master chips. The master chip may control access based on an access destination address and a timing generated by its own specifying unit 60 and timing control unit 80, without acquiring a timing and an access destination address from a slave chip.

EXPLANATION OF REFERENCE NUMERALS

1: Stacked memory
20: Memory unit
21: Regular memory block
22: Spare memory block
30: Address storage unit
40: Chip identification information storage unit
50: Comparison unit 51: Address comparison unit
52: Chip comparison unit
60: Specifying unit
70: Execution unit
80: Timing control unit

The invention claimed is:

1. A stacked memory comprising a plurality of memory chips stacked together,
the memory chips comprising:
a memory unit that includes a plurality of memory cells, is capable of storing data, and has a regular memory block for use mainly in reading/writing of data and a spare memory block for substituting for a defective memory cell in the regular memory block;
an address storage unit that stores, as a substitution source slice address, a slice address identifying the memory chip in which the regular memory block is to be substituted by the spare memory block, and stores, as a substitution source memory address, a memory address to be substituted, for at least two memory chips of the memory chips stacked together;
a comparison unit that compares a request address indicating the slice address and the memory address of an access request destination with the substitution source slice address and the substitution source memory address;
a specifying unit that specifies, based on a comparison result, the memory unit to which access is to be actually made and that generates an access timing;
a timing control unit that selects either the access timing generated or an access timing transmitted from another memory chip, and controls access to the memory unit at the access timing selected; and
an execution unit that executes reading/writing from/to the memory unit specified at the access timing selected.

2. A stacked memory comprising a plurality of memory chips stacked together,
each of the memory chips comprising:
a memory unit that includes a plurality of memory cells and is capable of storing data;
a specifying unit that generates an access timing for accessing the memory unit;
a timing control unit that selects either the access timing generated or an access timing transmitted from another memory chip, and controls access at the access timing selected; and
an execution unit that executes reading/writing at the access timing selected.

3. A stacked memory comprising a plurality of memory chips stacked together,
each of the memory chips comprising:
a memory unit that includes a plurality of memory cells, is capable of storing data, and has a regular memory block for use mainly in reading/writing of data and a spare memory block for substituting for a defective memory cell in the regular memory block;
an address storage unit that stores, as a substitution source slice address, a slice address identifying the memory chip in which the regular memory block is to be substituted by the spare memory block, and stores, as a substitution source memory address, a memory address to be substituted, for all the memory chips stacked together;
a comparison unit that compares a request address indicating the slice address and the memory address of an access request destination with the substitution source slice address and the substitution source memory address;
a specifying unit that specifies, based on a comparison result, the memory unit to which access is to be actually made; and
an execution unit that executes reading/writing from/to the memory unit specified.

4. The stacked memory according to claim 1, wherein the timing control unit specifies an access destination slice based on a slice address of an access destination outputted from one of the memory chips different from the memory chip to which the timing control unit belongs.

5. The stacked memory according to claim 1, wherein the timing control unit acquires, as an externally-provided instruction on an execution timing, a timing generated by one of the memory chips different from the memory chip to which the timing control unit belongs.

6. The stacked memory according to claim 1, wherein the comparison unit outputs, as a comparison result, a signal indicating whether or not the regular memory block or the spare memory block of the memory chip to which the comparison unit belongs is to be used.

7. The stacked memory according to claim 1, wherein each of the memory chips further comprises:
a chip identification information storage unit that stores, as chip identification information, an individual slice address that is a slice address identifying the memory chip to which the chip identification information storage unit belongs, wherein
the comparison unit comprises
a chip comparison unit that makes a comparison to determine whether or not the individual slice address matches a slice address included in the request address, and
an address comparison unit that makes a comparison to determine whether or not the request address matches the substitution source address, and
the specifying unit specifies the access destination address based on a comparison result.

8. The stacked memory according to claim 1, wherein the regular memory block and the spare memory block each have a redundant memory cell capable of substituting for a defective memory cell of the memory block to which the regular memory block and the spare memory block belong.

9. A method for manufacturing the stacked memory according to claim 1, the method comprising:
a stacking step of stacking semiconductor wafers including the plurality of memory chips;
a substitution step of substituting a defective memory cell of the regular memory block included in the semiconductor wafers stacked with a memory cell of the spare memory block; and
a dicing step of dicing the memory chips stacked, the dicing step being performed after the substitution step.

10. The method according to claim 9, further comprising:
before the stacking step, an interconnection layer forming step of designating, by means of an interconnection layer, one semiconductor wafer for constituting a master chip from among all the semiconductor wafers to be staked, the master chip being capable of transmitting an access request and a timing signal to a rest of the semiconductor wafers stacked.

11. The method according to claim 9, further comprising:
after the stacking step and before the substitution step, a master chip designating step of designating one semiconductor wafer for constituting a master chip from among all the semiconductor wafers stacked, the master chip being capable of transmitting an instruction signal and a timing signal to a rest of the memory chips stacked.

12. The stacked memory according to claim 2, wherein the timing control unit specifies an access destination slice based on a slice address of an access destination outputted from one of the memory chips different from the memory chip to which the timing control unit belongs.

13. The stacked memory according to claim 2, wherein the timing control unit acquires, as an externally-provided instruction on an execution timing, a timing generated by one of the memory chips different from the memory chip to which the timing control unit belongs.

14. The stacked memory according to claim 3, wherein the comparison unit outputs, as a comparison result, a signal indicating whether or not the regular memory block or the spare memory block of the memory chip to which the comparison unit belongs is to be used.

15. The stacked memory according to claim 3, wherein each of the memory chips further comprises:
 a chip identification information storage unit that stores, as chip identification information, an individual slice address that is a slice address identifying the memory chip to which the chip identification information storage unit belongs, wherein
 the comparison unit comprises
 a chip comparison unit that makes a comparison to determine whether or not the individual slice address matches a slice address included in the request address, and
 an address comparison unit that makes a comparison to determine whether or not the request address matches the substitution source address, and
 the specifying unit specifies the access destination address based on a comparison result.

16. The stacked memory according to claim 3, wherein the regular memory block and the spare memory block each have a redundant memory cell capable of substituting for a defective memory cell of the memory block to which the regular memory block and the spare memory block belong.

17. A method for manufacturing the stacked memory according to claim 3, the method comprising:
 a stacking step of stacking semiconductor wafers including the plurality of memory chips;
 a substitution step of substituting a defective memory cell of the regular memory block included in the semiconductor wafers stacked with a memory cell of the spare memory block; and
 a dicing step of dicing the memory chips stacked, the dicing step being performed after the substitution step.

18. The method according to claim 17, further comprising:
 before the stacking step, an interconnection layer forming step of designating, by means of an interconnection layer, one semiconductor wafer for constituting a master chip from among all the semiconductor wafers to be staked, the master chip being capable of transmitting an access request and a timing signal to a rest of the semiconductor wafers stacked.

19. The method according to claim 17, further comprising:
 after the stacking step and before the substitution step, a master chip designating step of designating one semiconductor wafer for constituting a master chip from among all the semiconductor wafers stacked, the master chip being capable of transmitting an instruction signal and a timing signal to a rest of the memory chips stacked.

* * * * *